United States Patent [19]
Ullman et al.

[11] Patent Number: 5,488,362
[45] Date of Patent: Jan. 30, 1996

[54] APPARATUS FOR CONTROLLING A VIDEO GAME

[75] Inventors: Noah T. Ullman; Adam N. Ullman, both of Glen Cove, N.Y.

[73] Assignee: Anaphase Unlimited, Inc., Glen Cove, N.Y.

[21] Appl. No.: 131,094

[22] Filed: Oct. 1, 1993

[51] Int. Cl.⁶ .................................................. H03K 17/94
[52] U.S. Cl. .................... 341/20; 341/176; 273/148 B; 273/438
[58] Field of Search ............................... 341/20, 21, 23, 341/176; 273/148 B, 438; 364/190, 709.11, 709.2, 709.08; 345/156, 157, 158

[56] References Cited

U.S. PATENT DOCUMENTS

| | | | |
|---|---|---|---|
| 3,022,878 | 2/1962 | Seibel, et al. | 400/479 |
| 3,700,836 | 10/1972 | Rackson | 273/438 |
| 4,074,444 | 2/1978 | Laenger, Sr. et al. | 341/21 |
| 4,107,642 | 8/1978 | Crummett | 273/438 |
| 4,353,552 | 10/1982 | Pepper, Jr. | 273/148 B |
| 4,414,537 | 11/1983 | Grimes | 341/20 |
| 4,491,325 | 1/1985 | Bersheim | 273/148 B |
| 4,519,097 | 5/1985 | Chappell, Jr. et al. | 273/148 B |
| 4,540,176 | 9/1985 | Baer | 273/148 B |
| 4,613,139 | 9/1986 | Robinson, II | 273/438 |
| 4,905,001 | 2/1990 | Penner | 341/20 |
| 4,925,189 | 5/1990 | Braeunig | 345/157 |
| 4,962,448 | 10/1990 | Demaio et al. | 364/190 |
| 5,038,144 | 8/1991 | Kaye | 341/176 |
| 5,047,952 | 9/1991 | Kramer et al. | 341/20 |
| 5,076,584 | 12/1991 | Openiano | 273/148 B |
| 5,139,261 | 8/1992 | Openiano | 273/148 B |
| 5,212,372 | 5/1993 | Quick et al. | 341/20 |
| 5,354,162 | 10/1994 | Burdea et al. | 14/5 |

FOREIGN PATENT DOCUMENTS

| | | |
|---|---|---|
| 1480243 | 7/1977 | United Kingdom . |
| 1245782 | 11/1988 | United Kingdom . |
| 92/09983 | 6/1992 | WIPO .............................. G09G 3/02 |

OTHER PUBLICATIONS

Power Glove™, Instructions, By Mattel, 35 pages, 1989.

"Victor Maxx, Power Maxx, Joystick Revolution–Instant Hand Control", 2 pages, Jan., 1994.

Sales brochure of Champ Control Pads, 1 page, Jan. 1994.

Bacard, Andre, "Welcome to Virtual Reality", Humanist V53 p. 42(2), Mar., 1993.

Churbuck, David, "The Ultimate Computer Game", Forbes V145 p. 154(3) Feb., 1990.

*Primary Examiner*—Scott A. Rogers
*Assistant Examiner*—Fan Lee
*Attorney, Agent, or Firm*—Dilworth & Barrese

[57] ABSTRACT

A hand attachment is lined above and below a wrist portion with parallel conductive contacts. One set of contacts is connected to a signal generator which generates control signals for moving characters in a video game. The second set of contacts is connected to the video game. Placing the hand at an angle selectively connects the contacts, sending the desired direction control signal to the video game. Conductive contacts are also located on the thumb and fingertips. Placing the thumb in contact with any of the fingertips connects a static signal generator to the video game. The hand attachment may be a glove or a wrist cuff. The control signals generated by the hand attachment may be wirelessly transmitted to the video game.

20 Claims, 8 Drawing Sheets

5,488,362

APPARATUS FOR CONTROLLING A VIDEO GAME

TECHNICAL FIELD

The present invention relates to an input device for interfacing with computers. More specifically, the present invention relates to a hand attachment which responds to movements of the wrist or fingers to produce command signals to control video elements on a video display.

BACKGROUND OF THE INVENTION

Joystick controllers have been commonly used to produce command signals that control game elements in video games. More recent video game controllers such as the SEGA GENESIS and the NINTENDO NES have replaced the joystick with an arcuate pad manipulated by a thumb.

When not in use, the control handle of the joystick, or arcuate pad, returns to a neutral position located in the center of its base. Moving the joystick from its neutral position in a desired direction closes a specific directional switch, thereby coupling a coded signal, unique to that particular direction and switch, to the video game. The video game responds to the coded signal by moving an object on the screen.

The advent of virtual reality has prompted the exploration of interactive control gloves for the video game market. In the field of gloves, movement of the fingers and an absolute position of the glove are monitored.

One such interactive control glove was the DATA-GLOVE, in which fiber optic cables line each finger. Movement of a finger changes the amount of light flowing through the fiber optic cables. A computer interface monitors the change in light intensity and compares it to the prior light intensity to determine how the finger moved. Spatial position and orientation is determined by a magnetic sensor.

The allure of virtual reality technology has prompted the video game market to shift from joystick controllers toward an interactive method of control. One of the first interactive control gloves for the video game market was the NINTENDO POWERGLOVE. Similar in function to the DATA-GLOVE, the POWERGLOVE recognizes movement of the fingers by detecting fluctuations in current through conductive ink located in the fingers of the POWERGLOVE, whereas the spatial position and orientation of the POWERGLOVE is monitored using ultrasonics.

A drawback of these prior art gloves is that they are incompatible with video games designed for joystick control because the prior art gloves cannot replicate the absolute control signals generated by a joystick. The prior art gloves rely on continuous finger and hand motion to produce the control signals required to operate the video game. If the user does not move his hand or fingers, then control signals are not generated, and the video game will not respond. As a result, the POWERGLOVE could not be used to play a simple video game such as SPACE INVADERS, which relies on holding a joystick in a one of two positions.

A further drawback of these prior art gloves is that the use of a "fire" button interferes with their operation. Specifically, using a prior art glove to actuate "fire" buttons during the operation of a video game requires moving the fingers, thereby generating unwanted control signals for the video game.

SUMMARY OF THE INVENTION

Accordingly, it is an object of the present invention to overcome the drawbacks of the prior art.

It is a further object of the present invention to produce a glove which can produce control signals compatible with joystick controlled video games.

Briefly stated, the present invention has a glove with four pairs of conductive contacts. The first contacts of each pair of conductive contacts are substantially equidistantly spaced along the perimeter of the glove just forward of a wrist portion. The second contacts of each pair of conductive contacts are in corresponding locations just rear of the wrist portion.

The first contacts of each pair of conductive contacts are connected to a signal generator that produces four coded control signals. Each coded control signal is unique to a specific pair of contacts and represents a specific direction of movement. The second contacts of each pair of contacts are connected to a decoder in the video game.

Each pair of contacts connects when a user moves his wrist, thereby creating an angle between his hand and his forearm. This connection couples the coded control signal to the decoder to cause a response in the video game.

In another embodiment of the present invention, the glove includes conductive contacts in selected areas of the glove. Bringing these areas into contact connects a static signal to a converter. The converter modifies the static signal into a code that a computer translates to produce designated effects, such as firing, punching, or jumping, in the video game.

According to a preferred embodiment of the invention there is provided an input device for a video computer comprising a wrist attachment, said wrist attachment including means for detecting movement in at least first and second directions of a hand relative to a forearm connected to said hand, means for selectively coupling at least first and second direction signals to a converter, and said means for selectively coupling being responsive to said means for detecting.

According to a feature of the invention, there is provided an input device for a computer, comprising a wrist attachment for a hand, said wrist attachment including at least first and second direction switches, each of said at least first and second direction switches being selectively closed responsive to said hand being at a predetermined angle to a forearm of said hand, each of said at least first and second switches connecting at least one direction signal to a converter, at least one static switch, said at least one static switch being closed responsive to a finger of said hand contacting a desired portion of said hand, and said at least one static switch including means for connecting at least one static signal to a converter.

According to a further feature of the invention, there is provided an input device for a computer, comprising a glove for a hand, said glove including first, second, third, fourth, fifth, sixth, seventh and eighth conductive contacts, said first, second, third and fourth conductive contacts being disposed on one of forward and rearward of a wrist portion of said glove, said fifth, sixth, seventh and eighth conductive contacts being disposed on the other of said one of forward and rearward of said wrist portion of said glove, said first conductive contact being connected to said fifth conductive contact responsive to said hand being at a first predetermined angle to a forearm of said hand, said second conductive contact being connected to said sixth conductive contact responsive to said hand being at a second predetermined angle to said forearm, said third conductive contact being connected to said seventh conductive contact responsive to said hand being at a third predetermined angle to said forearm of, said fourth conductive contact being connected to said eighth conductive contact responsive to said hand being at a fourth predetermined angle to said forearm, means for connecting said first, second, third and fourth contacts to first, second, third and fourth signals, respectively, and means for connecting said fifth, sixth, seventh and eighth contacts to a computer.

The command signals generated by the hand or finger movements may be transmitted via wired or wireless means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1A:
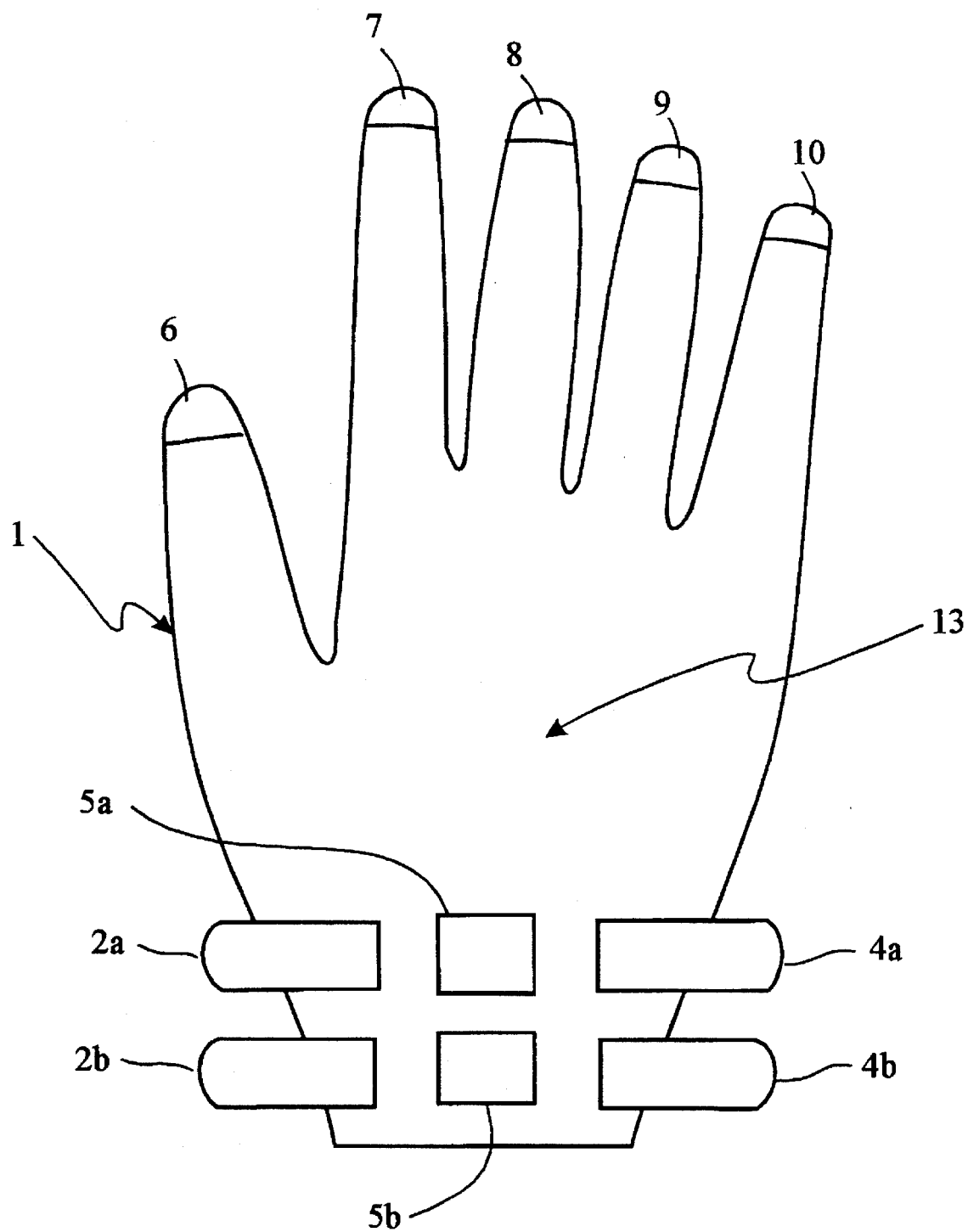
FIG. 1(a) is a front view of the preferred embodiment of the present invention.
Figure 1B:
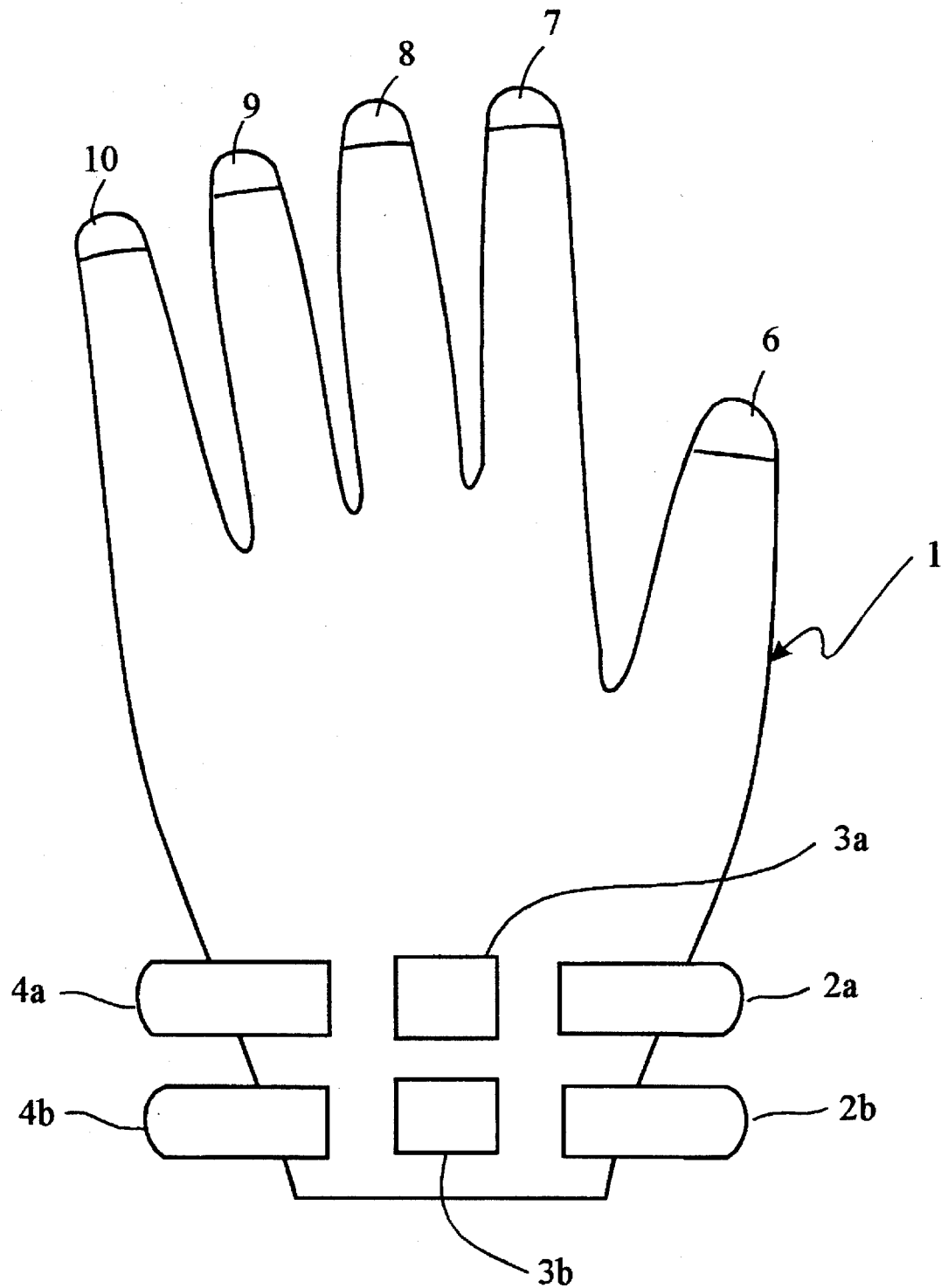
FIG. 1(b) is a rear view of the preferred embodiment of the present invention.

Referring now to FIGS. 1(a) and 1(b), a glove 1 has four pairs of direction contacts: an up pair 2a and 2b, a left pair 3a and 3b, a down pair 4a and 4b, and a right pair 5a and 5b. First direction contacts 2a, 3a, 4a and 5a are positioned at intervals along the perimeter of a hand portion of glove 1. Second direction contacts 2b, 3b, 4b and 5b are located along the wrist portion of glove 1, parallel to direction contacts 2a, 3a, 4a and 5a. Glove 1 also contains five static contacts, one on each fingertip, a thumb contact 6 and fingertip contacts 7–10.

Figure 2:
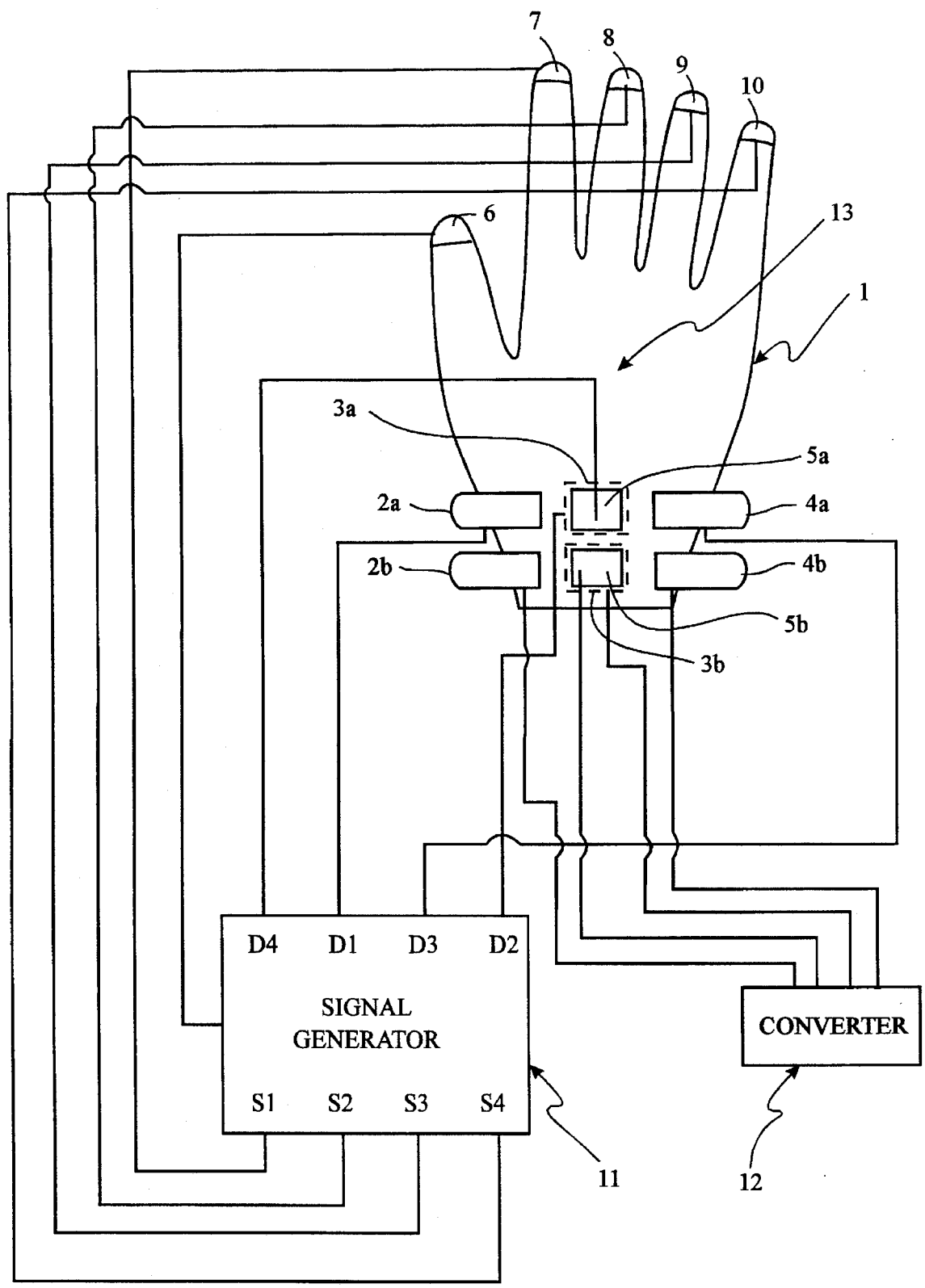
FIG. 2 is a front view of a second embodiment of the present invention.

Referring now to FIG. 2, a signal generator 11 generates four direction signals D1–D4. Each direction signal D1–D4 is a coded command which, when received by a video game, moves an object in a specific direction, or causes a specific action. The four most common directions are up, down, left and right, but others are possible depending on the nature of the video game in question.

Each direction signal D1–D4 of signal generator 11 is connected to a specific first direction contact 2a–5a. The corresponding second direction contact 2b–5b is connected to a converter 12.

Signal generator 11 also generates four static control signals S1–S4, which are designed to produce "static" results in the video game, such as firing or jumping, which are not based on movement of the fingers or of the hand.

Each static control signal S1–S4 is connected to a respective fingertip contact 7–10. Thumb contact 6 is connected to signal generator 11.

Figure 3:
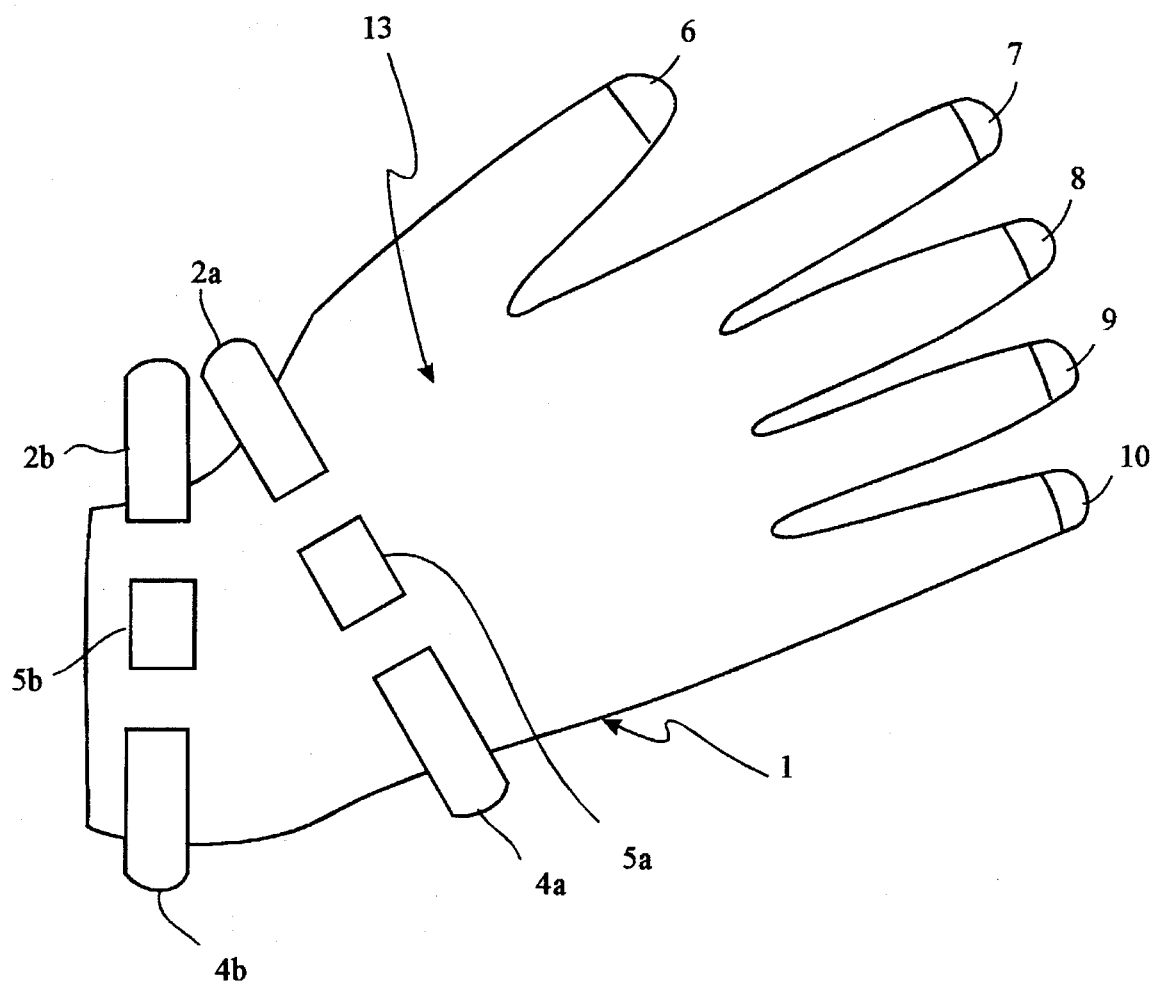
FIG. 3 is the preferred embodiment of the invention in use.

Referring now to FIGS. 2 and 3, the preferred embodiment of the present invention operates as follows. The user angles his wrist, thereby placing his hand at an angle to his forearm. This angle causes a connection between associated direction contacts. For example, up contacts 2a and 2b connect by angling the hand upward. Left contacts 3a and 3b connect by angling the hand to the left. If the hand is moved diagonally up and to the left, then both up contacts 2a and 2b and left contacts 3a and 3b connect.

When any pair of contacts 2a, 2b to 5a, 5b are brought together, a connection is made between signal generator 11 and converter 12. Based on which pairs of contacts are brought together, one or more direction signals D1–D4 are fed to converter 12, where they are encoded by converter 12 into a form that the video game translates into movement on the screen.

The connection between signal generator 11 and converter 12 stays connected until the user breaks the communication of direction signals D1–D4 to converter 12 by returning his hand to a neutral position. In the alternative, the user may establish a different control signal pattern by moving his hand to establish a desired contact. According to a preferred embodiment, the signal generator 11 generates codes as generated by a joystick controller such as the SEGA GENESIS and the converter 12 converts these codes in the same format as the joystick controller.

Figure 4:
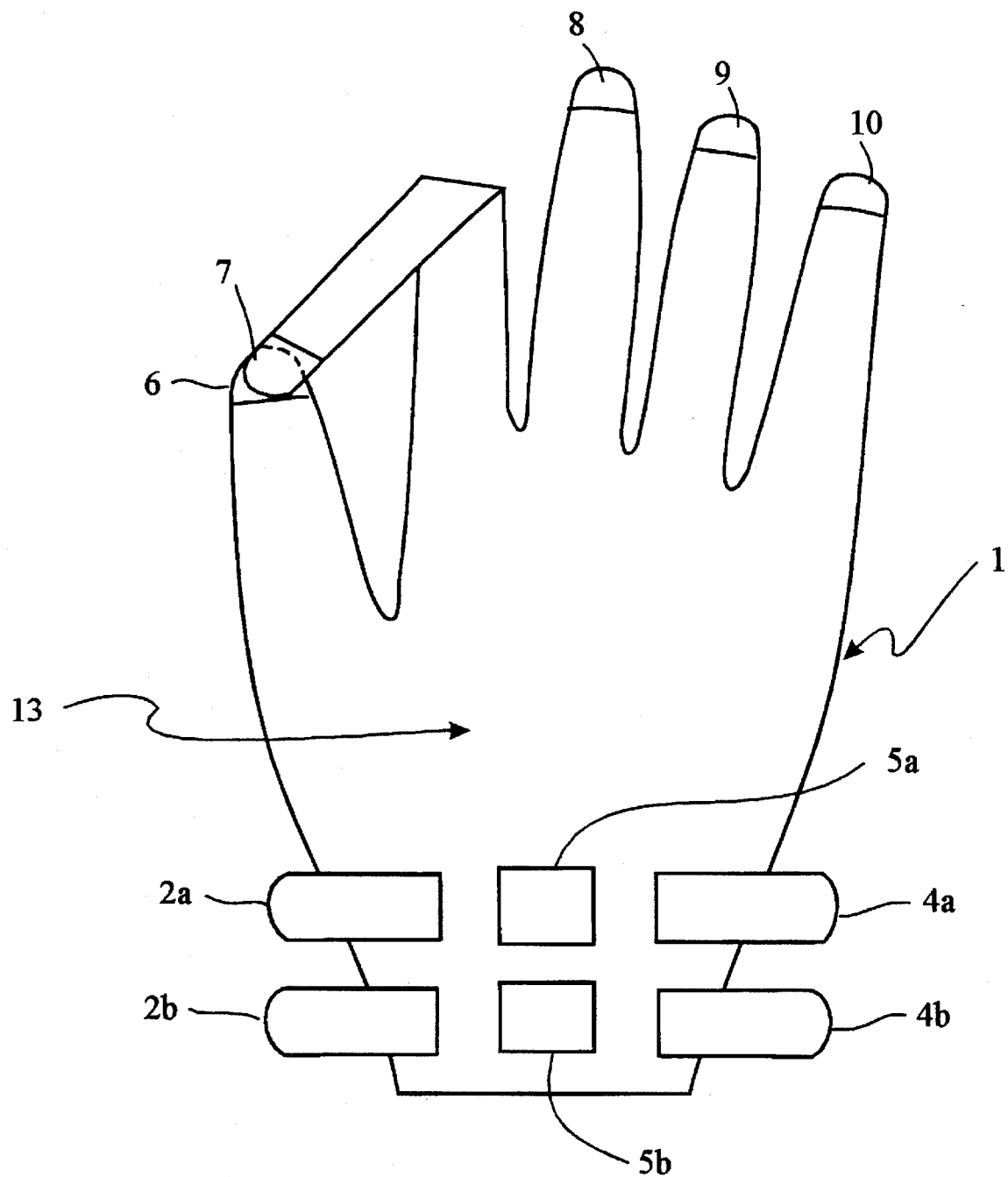
FIG. 4 is the second embodiment of the invention in use.

Referring now to FIGS. 2 and 4, the user can cause static action in the video game by connecting a thumb contact 6 with any of fingertip contacts 7–10. Once thumb contact 6 contacts any of fingertip contacts 7–10, signal generator 11 is connected to converter 12. Based on the fingertip contact 7–10 selected, the corresponding static control signal S1–S4 is fed to converter 12. Converter 12 encodes static control signals S1–S4 into a form that the video game translates into the static action, such as firing or jumping.

Figure 5:
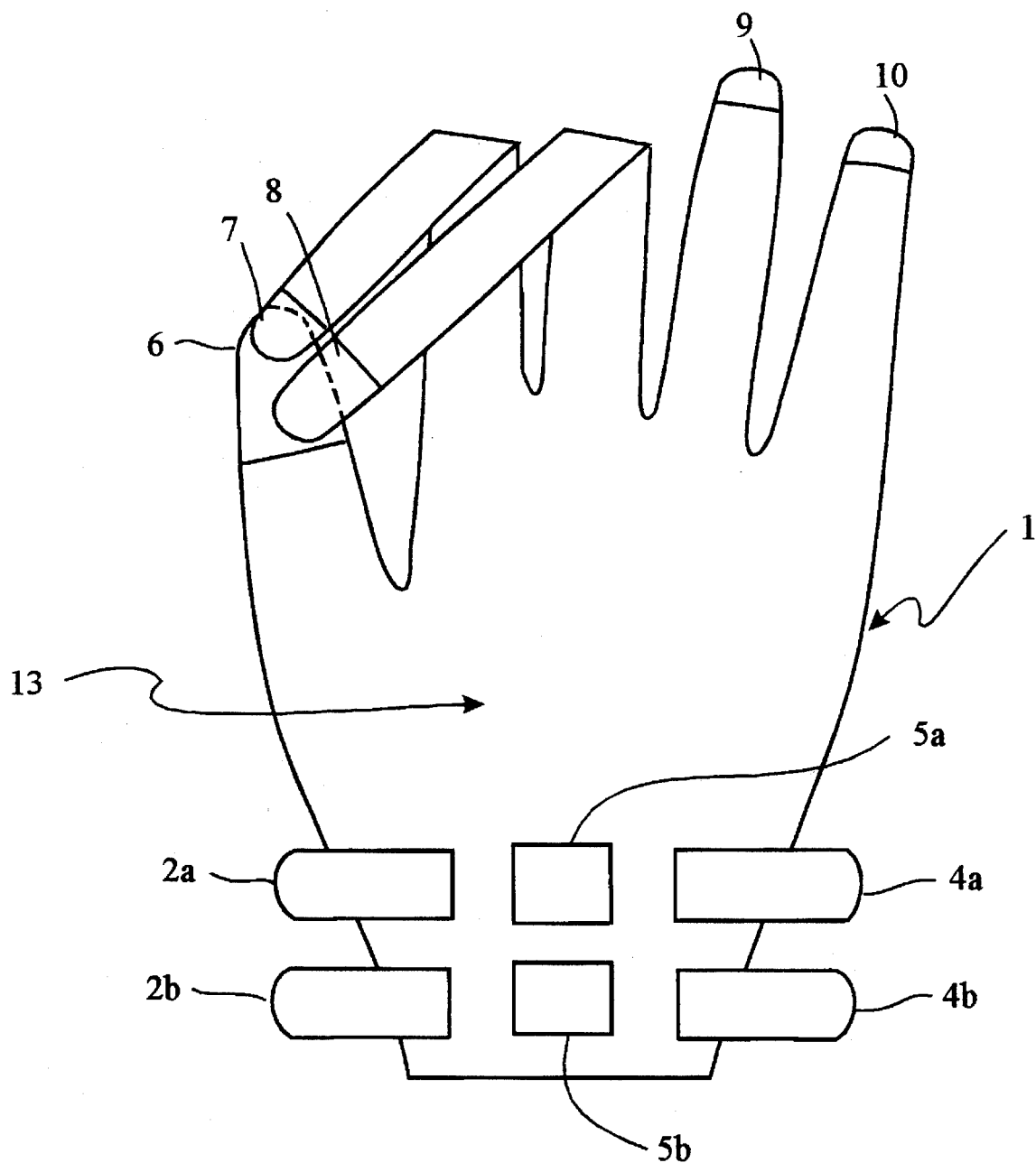
FIG. 5 is the second embodiment of the invention in use.

Referring to FIG. 5, certain video games function in response to commands requiring simultaneous depression of two or more action buttons. The present invention accomplishes this result by bringing thumb contact 6 together with two or more of fingertip contacts 7–10.

Figure 6:
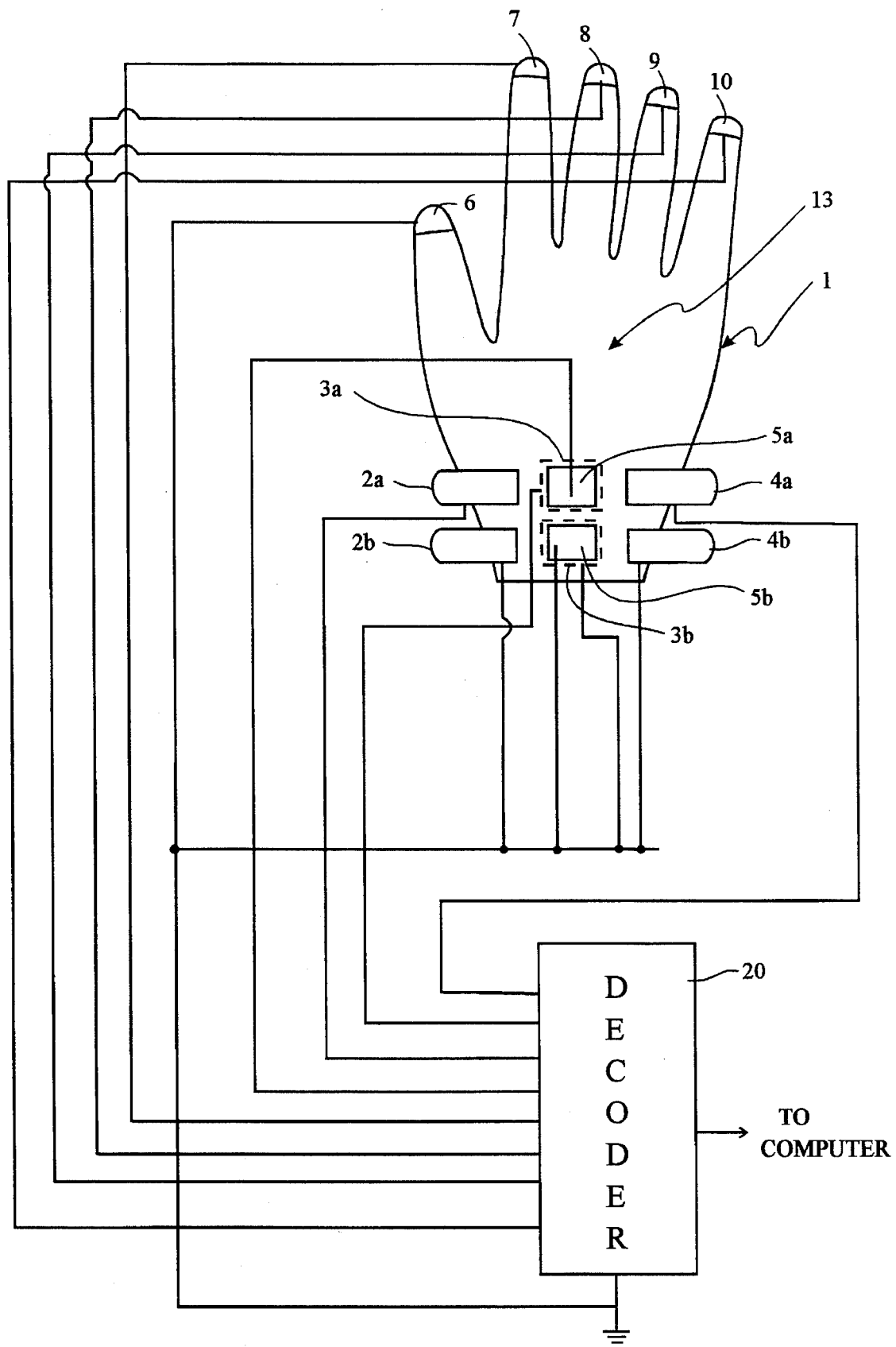
FIG. 6 is another embodiment of the invention in use.

Alternatively, referring to FIG. 6, contacts 2b–5b and 6, are connected to a common potential, such as ground, and contacts 2a–5a and 7–10 are then scanned to determine if contact has been made with one of contacts 2b–5b. A decoder 20 then communicates a status of contacts to a computer (not shown). Typically, contacts 2a–5a and 7–10 will be pulled high and register a contact when grounded. Such an arrangement reduces the wiring required and simplifies construction. The glove may be alternatively wired to emulate contacts provided in traditional joysticks. Various other methods of monitoring the status of multiple contacts may be employed in the present invention and are considered to be within the scope and spirit thereof.

In a preferred embodiment of the present invention, contacts 2–10 are preferably made from conductive rubber, but they may be made from any conductive substance, such as conductive ink or metal. In the alternative, mechanical elements such as reed switches, strain gauges, or mercury switches could be employed. Sealed elements allow a glove to be constructed without the need for exposed conductive surfaces.

Another embodiment of the present invention utilizes lever actuated switches (not shown) in place of contacts 2a–5b. The lever actuated switches are mounted in place of contacts 2b, 3b, 4b, and 5b, on the wrist portion of the glove 1. Levers of the lever actuated switches extend toward the hand portion of glove 1 and are displaceable by movement of the hand relative to the forearm. Thus, the lever actuated switches translate the same movements into electrical signals by their respective closures and openings as do contacts 2a–5b. Alternatively, the lever actuated switches can be mounted on the hand portion of the glove and have the lever extend towards the wrist. Other means of translating wrist movements into electrical signals are realizable by those skilled in the art having viewed this disclosure and are considered to be within the scope of the present invention.

Further, the present invention is not limited to actuation of static action in the video game by connecting thumb contact 6 to any of fingertip contacts 7–10. Actuation of static action can be accomplished by connecting thumb contact 6 and fingertip or contacts 7–10 to a palm portion 13 of glove 1.

Figure 7:
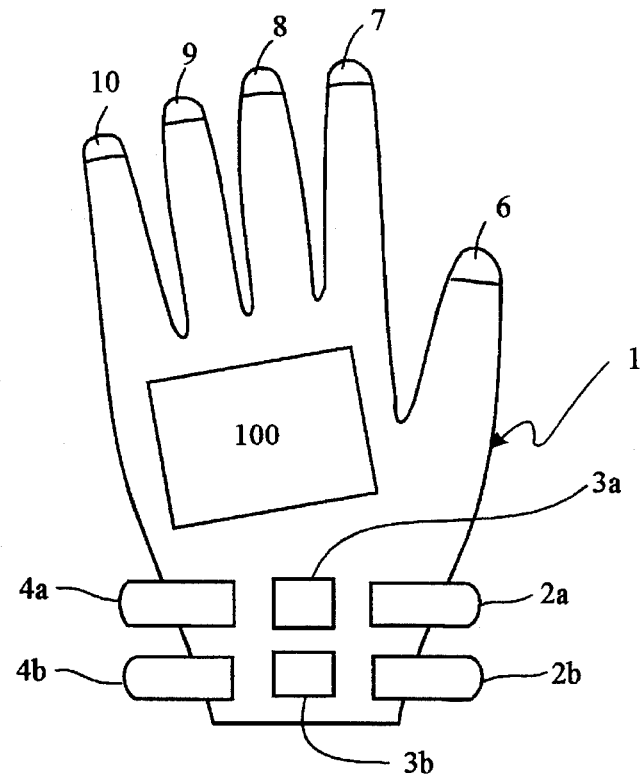
FIG. 7 illustrates the embodiment of the present invention having a wireless communications electronics module.

Referring to FIG. 7, which illustrates the embodiment of the invention substantially as described for FIG. 6, and having an electronics module 100 attached to the back of glove 1 for generating hand actuated commands and for wirelessly transmitting the commands to the video game controller.

Figure 8:
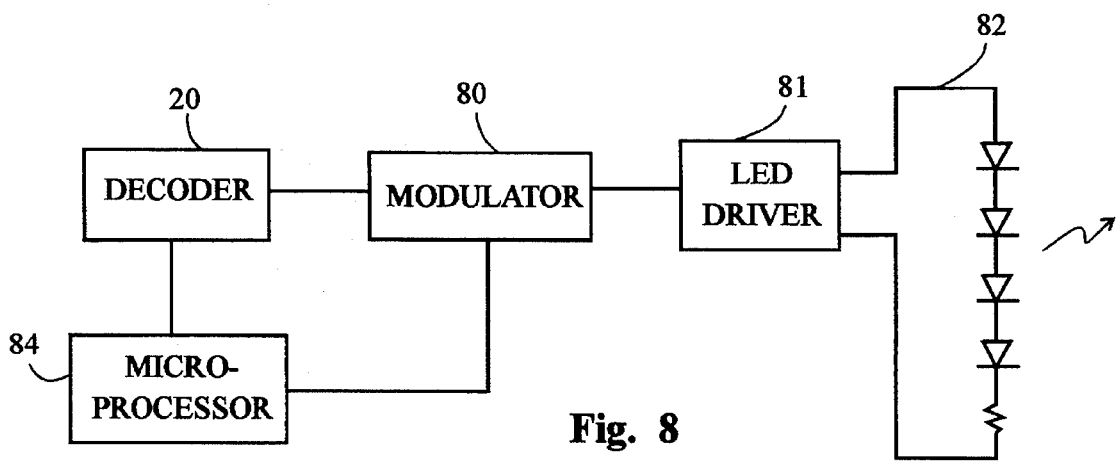
FIG. 8 is a block diagram of the components of the electronics module.

FIG. 8 is a block diagram of the components of electronics module 100. Microprocessor 84 controls the timing of decoder 20 for periodically scanning for actuation of any of the wrist contacts 2a to 5b and finger contacts 7 to 10. The decoded command is forwarded to modulator 80 for FM modulation. LED driver 81 amplifies the modulated signals for driving infrared diodes 82. A commercially available Motorola 6800 microprocessor, or any equivalent processor may be used. A battery (not shown) in the electronics module 100 provides the power source to the components of the electronics module.

Figure 9:
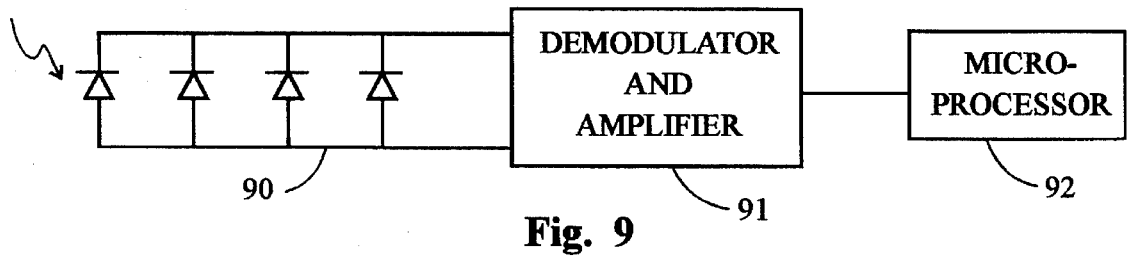
FIG. 9 is a block diagram of an infrared receiver.

The transmitted infrared signals are received by an infrared receiver in the video game controller. FIG. 9 illustrates a block diagram of the receiver. Infrared sensitive photodiodes 90 receives the infrared signals from electronics module 100. Demodulator and amplifier 91 demodules and amplifies the received signals. Microprocessor 92 interprets the signals as commands for activating the video game elements.

The wireless transmission technique provides flexibility and freedom of movement to the user. The receiver preferably is sensitive to infrared signals within 20 feet of the receiver. It is apparent to one skilled in the art that other wireless communication techniques, such as radio frequency or ultrasound may also be used.

An alternative embodiment of the present invention is similar to the embodiment described above except that the glove 1 is replaced by a cuff. The alternative embodiment provides a data input device having the wrist actuated contacts, described above, mounted upon a cuff equipped with a velcro fastener. Fingertip contacts connected to the cuff are individually fitted to fingertips of a user by means of elastic bands, velcro straps, or similar realizable fastening devices.

The use of the cuff allows the input device to be used upon either a left or right hand. Furthermore, the cuff allows for greater dexterity than a glove, which is of importance when a user is operating a keyboard and using the data input device as a replacement for a mouse. When used as a mouse replacement, the wrist actuated contacts operate in place of a roller ball of the mouse and the fingertip contacts are used in place of click buttons of the mouse.

In addition, the present invention is not limited to use with video games. Any computer which utilizes movement of a object desired to function under joystick or keyboard control can function using the present invention.

Having described the preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for providing command signals for controlling at least one video element on a video display, comprising:

a hand attachment;

a plurality of detectors disposed at spaced apart locations of said hand attachment for detecting directional movement;

each of said plurality of detectors for detecting a specific relative directional movement of an arm and hand thereof in a plane relative to said arm; and means for converting said detected movement to command signals for controlling the movement of said at least one video element in directions corresponding to said relative movement on said video display.

2. An apparatus according to claim 1, further comprising:

wireless transmission means for wirelessly transmitting said command signals to a remote receiver being disposed adjacent to said video display.

3. An apparatus according to claim 2, wherein said wireless transmission means includes transmissions in infrared.

4. An apparatus according to claim 1, wherein said plurality of detectors include conductive rubber.

5. An apparatus according to claim 1, wherein said hand attachment is a glove.

6. An apparatus according to claim 1, wherein said hand attachment is a cuff which attaches to a wrist.

7. An apparatus according to claim 1, wherein said plurality of detectors include at least one strain sensing element for sensing the movement of said hand relative to said forearm in said plane by effecting a change in stress upon said at least one strain sensor.

8. An apparatus according to claim 1, wherein said plurality of detectors include at least one reed switch and magnet being disposed such that movement of said hand relative to said forearm effects a change in a state of closure of said at least one reed switch.

9. An apparatus according to claim 1, wherein at least one of said plurality of detectors detects contact of a finger of said hand with a contact area on said hand attachment.

10. An apparatus according to claim 9, wherein said at least one of said plurality of detectors includes a contact on a finger of said hand and a second contact covering said contact area where said contact area is one of the palm and the thumb of said hand.

11. An apparatus for providing command signals for controlling the movement of a video element on a video display, comprising:

a hand attachment having detecting means for detecting movement and means for wirelessly transmitting said command signals to a remote receiver;

said detecting means having a plurality of detectors, each for detecting relative directional movement of an arm and hand thereof in a plane relative to said arm;

said means for wirelessly transmitting includes a wireless transmitter being attached to said hand attachment for transmitting said command signals to a remote receiver being disposed adjacent to said video display for causing movement of said video element in directions corresponding to said relative movement.

12. An apparatus according to claim 11, wherein said means for wirelessly transmitting includes transmissions in infrared.

13. An apparatus according to claim 11, wherein said detecting means includes means for detecting relative movement of at least one finger of said hand relative to a contact area on said hand attachment.

14. An apparatus according to claim 13, wherein said contact area on said hand attachment is one of the thumb and a palm of said hand.

15. An apparatus according to claim 11, wherein said means for wirelessly transmitting includes transmissions in radio frequency.

16. An apparatus for controlling the movement of an object on a computer display by movement of an arm and hand thereof, comprising:

a glove for said hand;

said glove including a plurality of detectors, each for detecting directional movement of said hand relative to said forearm;

said plurality of detectors being disposed around said glove such that motion of said hand in up, down, left and right directions beyond respective predetermined angles relative to said forearm is detected; and means for generating unique signals for each of said detected movement for causing movement of said object on said computer display in corresponding directions.

17. An apparatus according to claim 16, further including a plurality of additional detectors for detecting the contact of at least one finger of said hand with a contact area;

means for generating a respective unique command signal; and means for transmitting said unique command signal to a controller of said computer display.

18. An apparatus according to claim 17, wherein said contact area is one of the thumb and the palm of said hand.

19. An apparatus according to claim 16, further including means for wirelessly transmitting said unique signals to a controller of said computer display.

20. An apparatus according to claim 19, wherein said means for wirelessly transmitting includes transmissions in infrared.

* * * * *